No. 639,032. Patented Dec. 12, 1899.
H. R. HAMER.
VEHICLE AXLE NUT.
(Application filed Oct. 2, 1899.)
(No Model.)
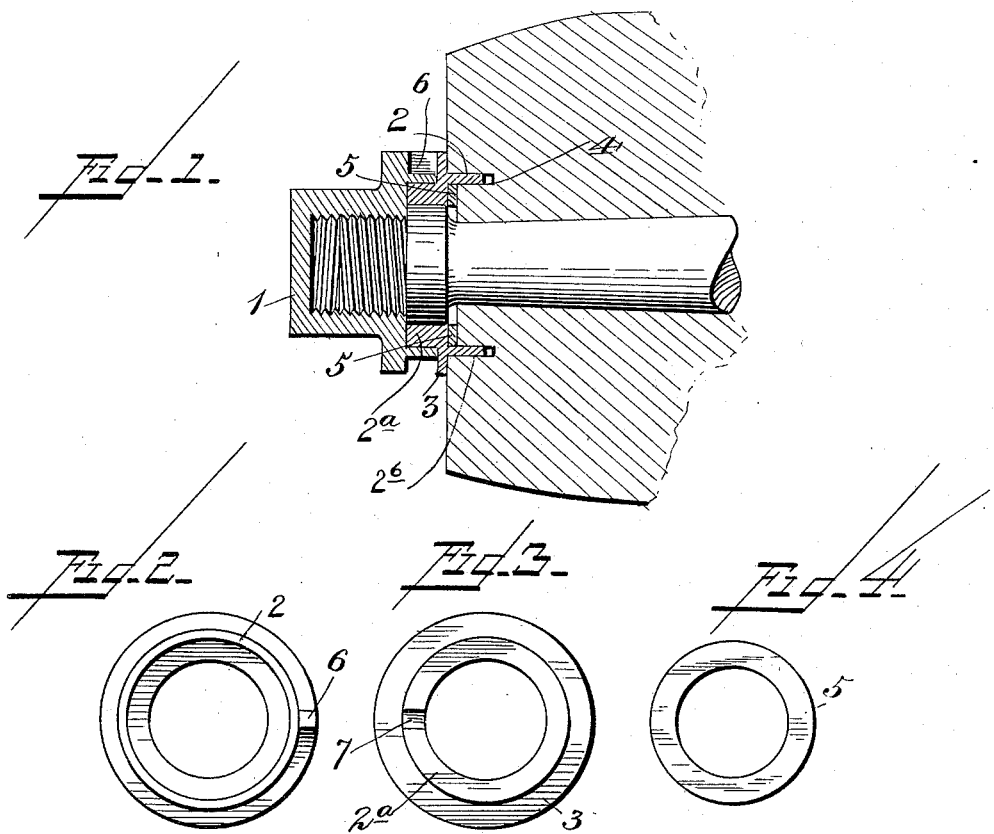
WITNESSES:
Frank L. Durand,
E. P. Bunger.
INVENTOR:
Harry R. Hamer,
BY
Louis Bagger & Co.
ATTORNEYS.

UNITED STATES PATENT OFFICE.

HARRY R. HAMER, OF NORTH ADAMS, MASSACHUSETTS.

VEHICLE-AXLE NUT.

SPECIFICATION forming part of Letters Patent No. 639,032, dated December 12, 1899.

Application filed October 2, 1899. Serial No. 732,334. (No model.)

*To all whom it may concern:*

Be it known that I, HARRY R. HAMER, a citizen of the United States, residing at North Adams, in the county of Berkshire and State of Massachusetts, have invented new and useful Improvements in Vehicle-Axle Nuts, of which the following is a specification.

My invention relates to improvements in vehicle-axle nuts. It provides for compensating or taking up looseness and wear of the axle and axle-box, thus preserving the proper relation and working of the parts, preventing oscillations, and obviating premature discarding or frequent repairing of said parts, and for otherwise promoting utility, convenience, and facility in use.

My invention consists of an annulus or collar extension for the nut, either integral with the nut or separate therefrom, and in details of construction and arrangement of the parts, substantially as hereinafter more fully disclosed, and specifically pointed out by the claim.

In the accompanying drawings, embodying the preferred form of my invention, Figure 1 is a sectional view showing the parts assembled. Fig. 2 is a detail view of the annulus or collar. Fig. 3 is a front view of the same. Fig. 4 is a view of the washer.

In carrying out my invention I employ, in connection with an ordinary vehicle-axle nut 1, an annulus or collar 2, adapted to form an inward extension thereof to compensate or take up wear of the axle and axle-box.

The annulus or collar 2 consists of two parts, as it were, one part $2^a$ being of a diameter to adapt it to fit within or interiorly of the annular flange of the nut 1 to enable the collar or annulus to form an extension on said nut. The other part $2^b$ of said collar or annulus, of a greater interior diameter than the aforesaid part $2^a$, coincides substantially with the flange of said nut, thus providing therefor or taking its place in fitting said collar extension upon the axle, as in applying the same where the axle or axle-box is worn or become loose, to maintain the proper working relation of the parts, prevent oscillations, and obviate the premature discarding or frequent repairing of said parts. The collar extension 2, thus generally formed, has a radial or circumferential flange 3, adapted to rest or abut against the circular or annular flange of the nut 1, and the part $2^b$ of said collar extension has a shoulder 4 at its base to limit the insertion therein of separate rings, one of which, 5, being shown, when employed, or it may be desired to employ such, to further provide for compensating or taking up wear or looseness to the last degree.
These rings may be of different thicknesses to meet the emergencies of the case, according to the amount of wear to be compensated.

A spline 6 may be formed on the nut to engage a feather 7 on the flange $2^a$.

Having thus fully described my invention, what I claim is—

A vehicle-axle having its outer end threaded and a shoulder or enlargement at the termination of the threads, a cap-nut fitting the threaded end of the axle and bearing against the enlargement, a take-up collar or annular extension having a flange which fits over the enlargement on the axle and a flange of greater interior diameter to fit within the hub, a flange on the cap-nut fitting over the flange of the take-up which fits the enlargement on the axle, and a ring or metal washer fitted between the hub and the take-up, substantially as described.

In testimony whereof I have hereunto set my hand in presence of two subscribing witnesses.

HARRY R. HAMER.

Witnesses:
ARTHUR P. CARPENTER,
CORNELIUS A. PARKER.